US006278590B1

(12) United States Patent
Gill et al.

(10) Patent No.: US 6,278,590 B1
(45) Date of Patent: Aug. 21, 2001

(54) HIGH MOMENT LAMINATED LAYER WITH NICKEL COBALT OR NICKEL IRON COBALT BASED ALLOY LAYER FOR FIRST POLE PIECE OF WRITE HEAD

(75) Inventors: Hardayal Singh Gill, Portola Valley; John David Westwood, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,996

(22) Filed: Dec. 2, 1998

(51) Int. Cl.[7] ............................ G11B 5/127; G11B 5/147

(52) U.S. Cl. ............................................ 360/317; 360/126

(58) Field of Search ..................................... 360/317, 318, 360/121, 125, 126

(56) References Cited

U.S. PATENT DOCUMENTS

| | | | |
|---|---|---|---|
| 5,535,079 * | 7/1996 | Fukazawa et al. | 360/317 |
| 5,751,522 * | 5/1998 | Yamada et al. | 360/317 |
| 5,835,313 * | 11/1998 | Sato et al. | 360/317 |
| 5,894,388 * | 4/1999 | Sato et al. | 360/317 |
| 5,896,254 * | 4/1999 | Sato et al. | 360/126 |
| 5,986,856 * | 11/1999 | Macken et al. | 360/317 |

* cited by examiner

*Primary Examiner*—Allen T. Cao
(74) *Attorney, Agent, or Firm*—Gary Cary Ware & Freidenrich; Ervin F. Johnston

(57) ABSTRACT

A material is provided for the first shield and/or second shield/first pole piece layer of a merged MR head. The material employed is nickel cobalt ($Ni_{70}Co_{30}$) (wt. %) or a nickel iron cobalt alloy. In a second shield/first pole piece layer a further preferred embodiment is first and second layers wherein the first layer is nickel cobalt or a nickel iron cobalt alloy and the second layer is a laminate of a high magnetic material, such as iron nitride (FeN) laminated with aluminum oxide ($Al_2O_3$). The nickel cobalt or nickel iron cobalt alloy layers have a higher intrinsic anisotropic ($H_K$) and can better withstand the processing fields employed during the various annealing steps in the construction of the head. Accordingly, the magnetic domains of the first and second shield layers do not change position from a desired parallel position to the ABS. By maintaining their parallel position, applied fields during the operation of the head, such as from the write head or the media, does not move the domain walls around to cause Barkhausen noise. The high magnetic moment laminated layer for the second shield/first pole piece layer serves as a good first pole piece flux conducting layer for the write head portion of the magnetic head. Accordingly, the second shield/first pole piece layer serves two functions, namely a stable shield for the read head and conducting flux for the write head.

23 Claims, 14 Drawing Sheets

(ABS)

(NiFe-AS DEPOSITED AND ANNEALED IN THE PRESENCE OF A FIELD PARALLEL TO THE ABS)

(NiFe-HARD BAKE ANNEALING OR RESETTING IN PRESENCE OF A FIELD, PERPENDICULAR TO THE ABS (NiFe-WRITE OR DISK FIELD)

(Ni(Fe)Co AS DEPOSITED AND ANNEALED IN THE PRESENCE OF A FIELD PARALLEL TO THE ABS

Ni(Fe)Co AFTER HARDBAKE ANNEALING OR RESETTING IN THE PRESENCE OF A FIELD PERPENDICULAR TO THE ABS

Ni(Fe)Co WRITE OR DISK FIELDS

Ni(Fe)Co FIELDS TERMINATED

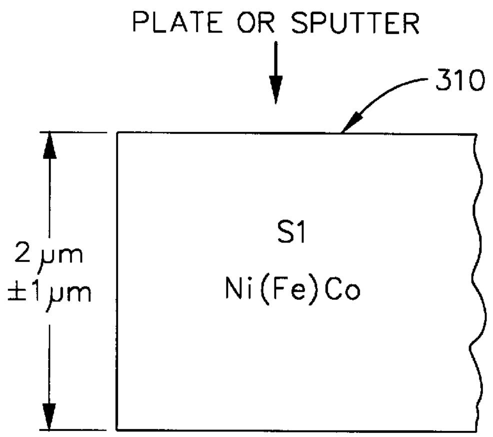
FIG. 17A
(S1)
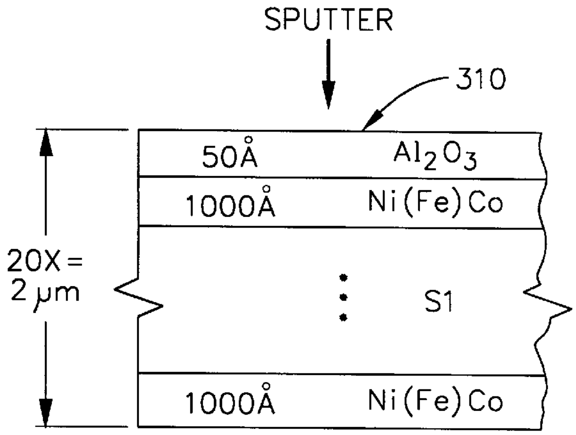
FIG. 17B
(S1)
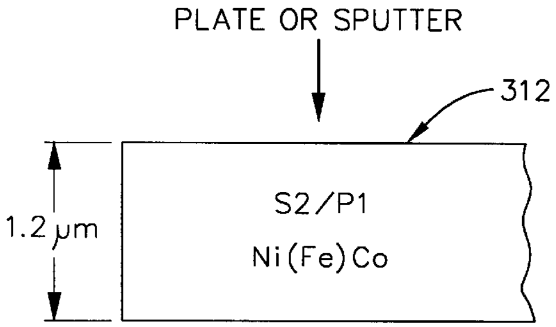
FIG. 18A
(S2/P1)
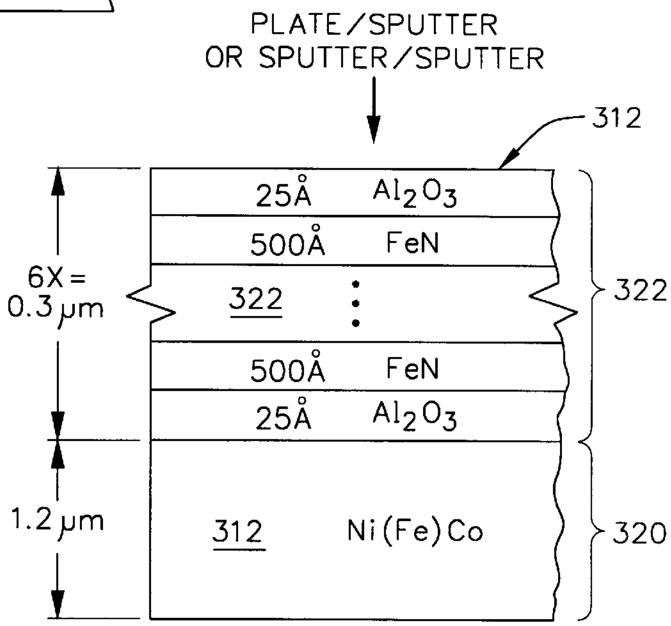
FIG. 18B (S2/P1)

(S2/P1)

(S2/P1)

(S2/P1)

(S2/P1)

(S2/P1)

HIGH MOMENT LAMINATED LAYER WITH NICKEL COBALT OR NICKEL IRON COBALT BASED ALLOY LAYER FOR FIRST POLE PIECE OF WRITE HEAD

BACKGROUND OF THE INVENTION

1. Field of the Invention

The present invention relates to a high moment laminated layer with a nickel cobalt or nickel iron cobalt based alloy layer for the first pole piece of a write head and more particularly to a high moment laminated layer with a $Ni_{70}Co_{30}$ (wt. %) layer or a nickel iron cobalt based alloy layer.

2. Description of the Related Art

Information in a computer is stored in a device that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head. The pole piece layers are connected at a back gap. Current conducted to the coil layer induces a magnetic field across the gap between the pole pieces. This field fringes across the gap at the ABS for the purpose of writing the aforementioned magnetic impressions in tracks on moving media, such as in circular tracks of the aforementioned rotating disk.

A spin valve sensor has been recently employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but is free to rotate in response to external magnetic fields. The magnetization of the pinned layer is typically pinned by exchange coupling with an antiferromagnetic layer.

In a merged magnetoresistive (MR) head the second shield layer of the read head also functions as the first pole piece layer in the write head. Because of the proximity of the second shield/first pole piece layer (S2/P1) to the spin valve sensor it is important that this layer be magnetically stable. In order to achieve this purpose the S2/P1 layer is formed by plating or sputter deposition in the presence of a field that is parallel to the ABS in the plane of the S2/P1 layer. The field orients the easy axis (e.a.) of the S2/P1 layer in the direction of the field, namely parallel to the ABS and in the plane of the S2/P1 layer. This orientation also means that the magnetic domains in the S2/P1 layer in the vicinity of the sensor are also aligned with their longitudinal axes parallel to the ABS in the plane of the S2/P1 layer. It is important that these domains retain their orientation as formed and not move around when subjected to extraneous fields such as fields from the write head or fields from the rotating magnetic disk. When these domain walls move noise is generated which is referred to in the art as Barkhausen noise. This noise seriously degrades the read signal of the read head. Further, if the domain walls do not come back to their original position the S2/P1 layer exerts a differently oriented field on the free layer of the spin valve sensor. This changes the magnetic bias on the free layer causing read signal asymmetry.

Nickel iron (NiFe) with a composition of approximately $Ni_{81}Fe_{19}$ (wt. %) has been typically employed for the S2/P1 layer as well as the first shield layer (S1). Nickel iron (NiFe) is a soft magnetic material that provides good shielding of the spin valve sensor from magnetic fields except within the read gap where signals are sensed by the sensor. Nickel iron (NiFe) also has near zero magnetostriction so that after lapping the head to form the ABS there is near zero stress induced anisotropy. Unfortunately, however, nickel iron (NiFe) has a low intrinsic magnetic anisotropy ($H_K$). Intrinsic magnetic anisotropy is the amount of applied field required to rotate the magnetic moment of the layer 90 degrees from an easy axis orientation. The intrinsic magnetic anisotropy of nickel iron (NiFe) is 2–5 oersteds (Oe). After the first shield layer (S1) and the S2/P1 layers are formed they are subjected to unfavorable magnetic fields that are required in subsequent processing steps. The insulation layers of the insulation stack are hard baked in the presence of a magnetic field that is directed perpendicular to the ABS for the purpose of maintaining the magnetic spins of the antiferromagnetic pinning layer in the spin valve sensor oriented in a direction perpendicular to the ABS. After completion of the head, the head is subjected to an additional anneal in the presence of an external magnetic field directed perpendicular to the ABS for the purpose of resetting the spins of the pinning layer perpendicular to the ABS. These annealing steps reduce the anisotropy field of nickel iron (NiFe) to very low values of 0–1 Oe.

The field typically employed for maintaining the spins of the pinning layer during hard bake of the insulation stack is about 1500 Oe and the field for resetting the spins of the pinning layer after completion of the head is about 13 KG. Because of the low intrinsic magnetic anisotropy of a nickel iron (NiFe) shield layer the aforementioned anneals in subsequent processing can cause the easy axis and the magnetic domains of the shield layer to switch their orientation such that they are no longer parallel to the ABS. The magnetic field present in these anneals reduces or destroys the intrinsic anisotropy field that was created in the nickel iron (NiFe) when it was originally formed and may create an anisotropy field perpendicular to the ABS. This is a very unfavorable position for magnetic domains of a shield layer. When the shields are subjected to perpendicular fields from the write head during the write function or perpendicular fields from the rotating magnetic disk the magnetic domains will move. This causes Barkhausen noise which degrades the read signal and causes a potential change in biasing of the spin valve sensor which results in read signal asymmetry.

Accordingly, there is a strong felt need for a material for the first shield layer (S1) and for the second shield/first pole piece layer (S2/P1) layer that will remain stable after being subjected to heat and magnetic fields employed in processing steps subsequent to making the shield layers.

SUMMARY OF THE INVENTION

We have replaced the nickel iron (NiFe), typically employed in the first shield layer (S1) and the second shield/first pole piece (S2/P1) layer, with a nickel cobalt alloy, which is preferably $Ni_{70}Co_{30}$ (wt. %), or a nickel iron cobalt alloy, which is preferably in the composition range $Ni_{0.81(100-x)+y}Fe_{0.19(100-x)-y}Co_x$ (wt. %) layer where $0.5 \leqq x \leqq 25$ and $-5 \leqq y \leqq 5$. Another preferred composition is $Ni_{73}Fe_{18}Co_9$ (wt. %). The nickel cobalt or nickel iron cobalt can be formed by either plating or sputtering. If sputtering is employed the nickel cobalt or nickel iron cobalt, which two alloys are referred to as nickel (iron) cobalt, is laminated with alternate layers of a nonmagnetic electrically insulative material, such as aluminum oxide ($Al_2O_3$). The intrinsic magnetic anisotropy ($H_K$) of cobalt iron $Ni_{70}Co_{30}$ is about 25 Oe. This higher H allows the shield to suffer a significant reduction in anisotropy field during subsequent processing of the head and still retain sufficient anisotropy field ($H_K$) to overcome possible unfavorable stress induced anisotropy due to shield shape and air bearing surface formation. This means that the magnetic domains of the shield layers do not move from their parallel position to the ABS. The only movement is the magnetic moment of the shield layer which can move from the easy axis orientation and then return to the easy axis orientation when the field is removed. Nickel cobalt ($Ni_{70}Co_{30}$) (wt. %) also has near zero magnetostriction which means that the shield layer will have near zero stress induced magnetic anisotropy after the head is lapped. While it is good that the intrinsic $H_K$ of the nickel cobalt ($Ni_{70}Co_{30}$) (wt. %) is large, it may be desirable, depending on the annealing times and temperatures in the process, that the $H_K$ be less than 25 Oe so that the shield is softer magnetically (higher permeability) to serve its function as a good shield layer for the spin valve sensor.

In a preferred embodiment a nickel iron cobalt alloy ($Ni_{0.81(100-x)+y}Fe_{0.19(100-x)-y}Co_x$ (wt. %) layer where $0.5 \leqq x \leqq 25$ and $-5 \leqq y \leqq 5$) is employed for the shield layers. The $H_K$ of the nickel iron cobalt alloy can be 5–20 Oe depending upon the amount of cobalt (Co) employed. Again the nickel iron cobalt alloy ($Ni_{0.81(100-x)+y}Fe_{0.19(100-x)-y}CO_x$ (wt. %) layer where $0.5 \leqq x \leqq 25$ and $-5 \leqq y \leqq 5$) can be either plated or sputtered in a laminate. In a still further preferred embodiment, the composition is near $Ni_{73}Fe_{18}Co_9$ (wt. %) which has $H_K$ of about 10–12 Oe.

A nickel cobalt or nickel iron cobalt alloy second shield/first pole piece (S2/P1) layer provides a good shield and a fair first pole piece. In contrast to the first shield layer (S1) the S2/P1 layer is required to conduct the write field in response to the write coil. This requires a high moment material. We have improved the S2/P1 layer by making the S2/P1 layer of first and second layers wherein the first layer is nickel cobalt or a nickel iron cobalt alloy and the second layer is a laminate of high moment magnetic material. In a preferred embodiment the high moment magnetic material layer is iron nitride (FeN) laminated with aluminum oxide ($Al_2O_3$). After forming a plated or laminated layer of nickel cobalt or nickel iron cobalt alloy the iron nitride (FeN) laminated layer is sputtered thereon. The iron nitride may be alloyed with other elements such as M=B, Al, Si, Ti, Zr, Hf, V, Nb, Ta, Cr, Mo, Ru, Ga, Ge, Sn. Since a high moment is not required for the first shield layer (S1) it does not require a high moment laminated layer.

An object of the present invention is to provide a magnetically stable first shield (S1) layer and/or a magnetically stable second shield/first pole piece (S2/P1) layer for a merged magnetic head.

Another object is to provide a first shield (S1) layer and/or a second shield/first pole piece (S2/P1) layer with magnetic domains that do not change their orientation parallel to the ABS when subjected to processing fields during the construction of the head.

A further object is to provide a material for shield layers of a magnetic head that has a higher intrinsic anisotropy field ($H_K$) to withstand the reduction in anisotropy field ($H_K$) that occurs as a result of annealing steps in the construction of the magnetic head after constructing the shield layers.

Still another object is to provide a material for a first shield (S1) layer and/or a second shield/first pole piece (S2/P1) layer that has near zero magnetostriction and retains an intrinsic magnetic anisotropy after completing the head fabrication process that is greater than any stress induced anisotropy that may be created during processing.

Still a further object is to provide a second shield/first pole (S2/P1) layer that has high moment for conducting a write field and a higher intrinsic magnetic anisotropy.

Still another object is to provide a method of making a magnetically stable first shield (S1) layer and/or a magnetically stable second shield/first pole piece (S2/P1) layer.

Other objects and advantages of the invention will become apparent upon reading the following description taken together with the accompanying drawings.

BRIEF DESCRIPTION OF THE DRAWINGS

FIGS. 17A and 17B are elevation views of a portion of the first shield layer (S1) with various embodiments of materials used therefor; and FIGS. 18A–18G are elevation views of a portion of the second shield/first pole piece (S2/P1) layer with various combinations of materials and laminates according to the present invention.

DESCRIPTION OF THE PREFERRED EMBODIMENTS

Magnetic Disk Drive

Figure 1:
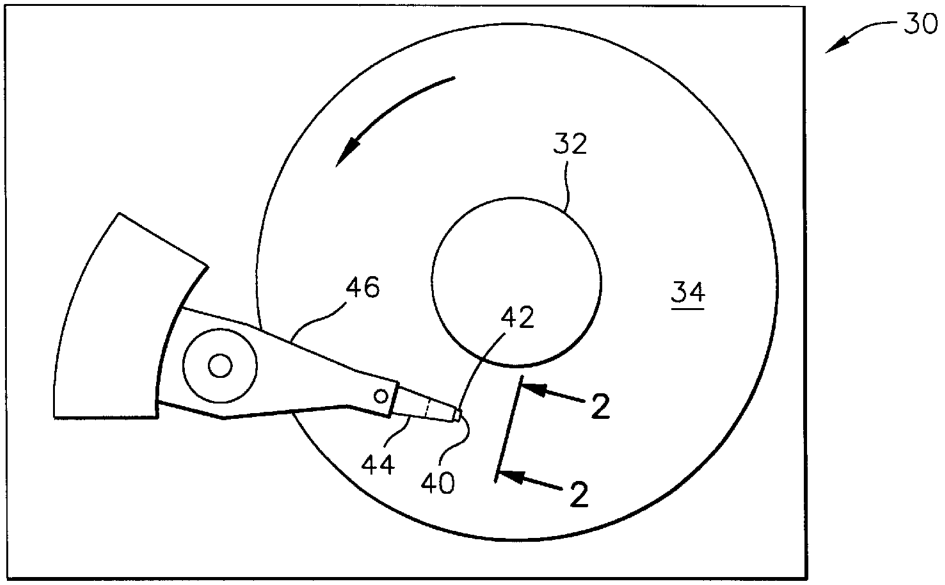
FIG. 1 is a planar view of an exemplary magnetic disk drive.
Figure 2:
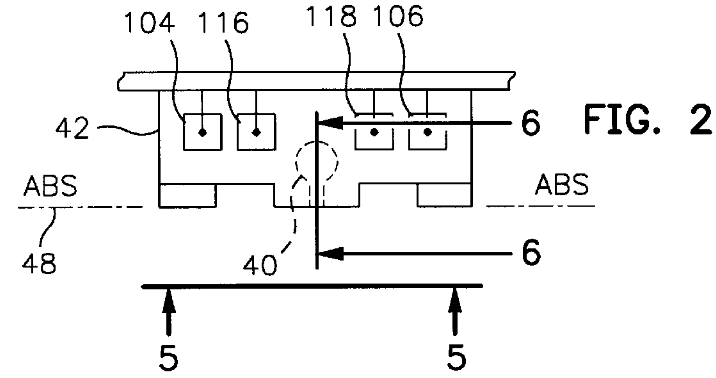
FIG. 2 is an end view of a slider with a magnetic head of the disk drive as seen in plane 2—2.
Figure 3:
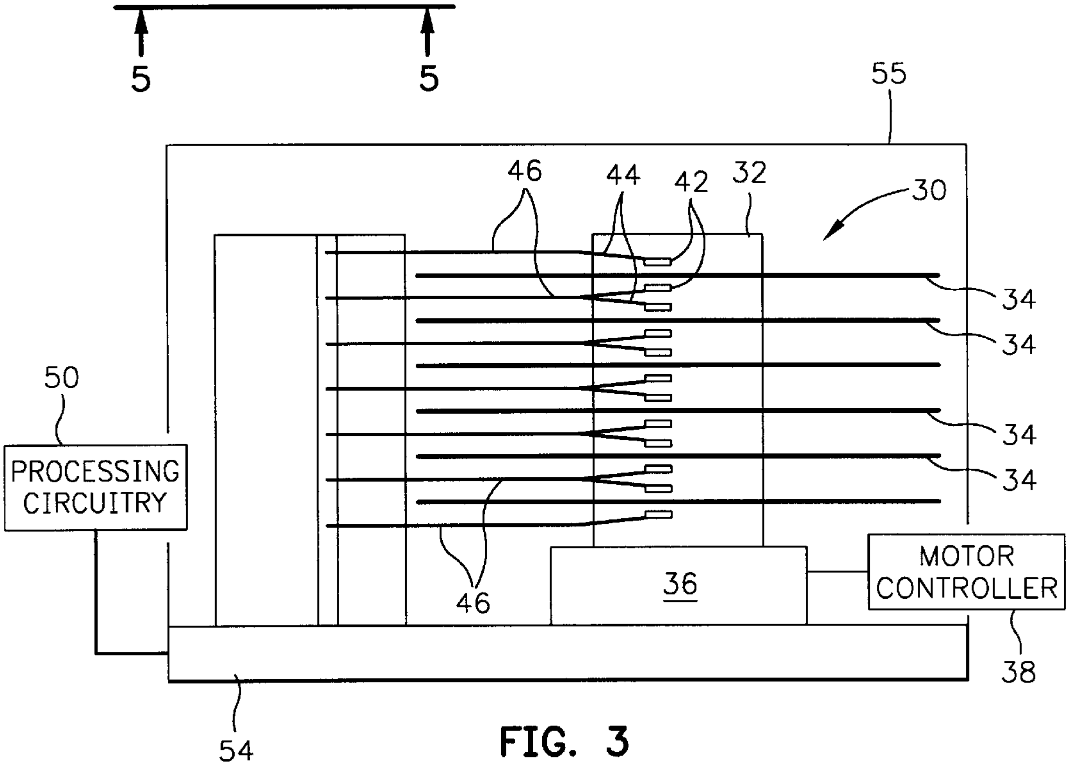
FIG. 3 is an elevation view of the magnetic disk drive wherein multiple disks and magnetic heads are employed.
Figure 4:
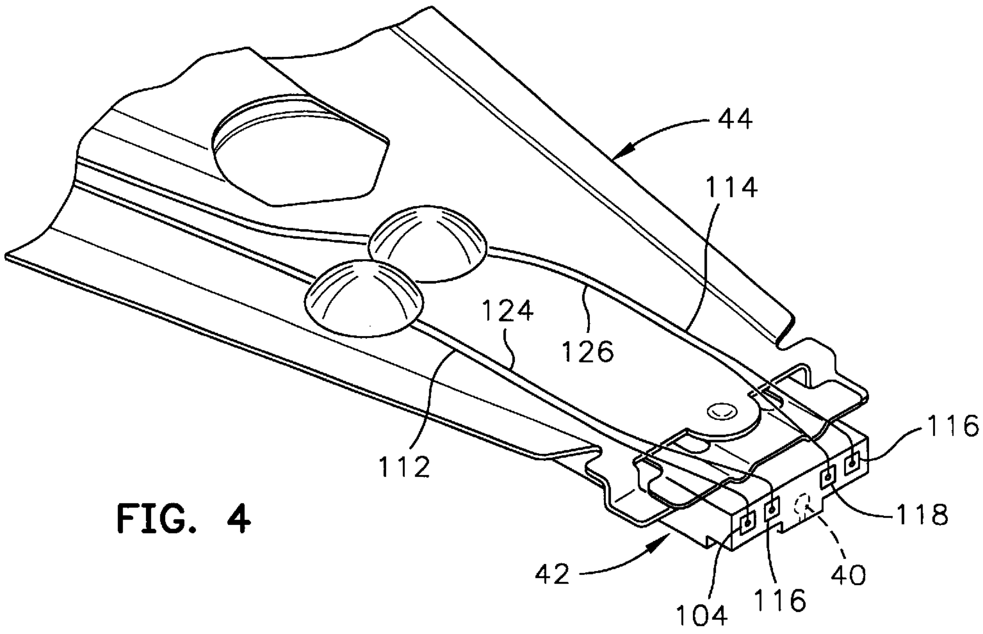
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing 55, as shown in FIG. 3.

Figure 5:
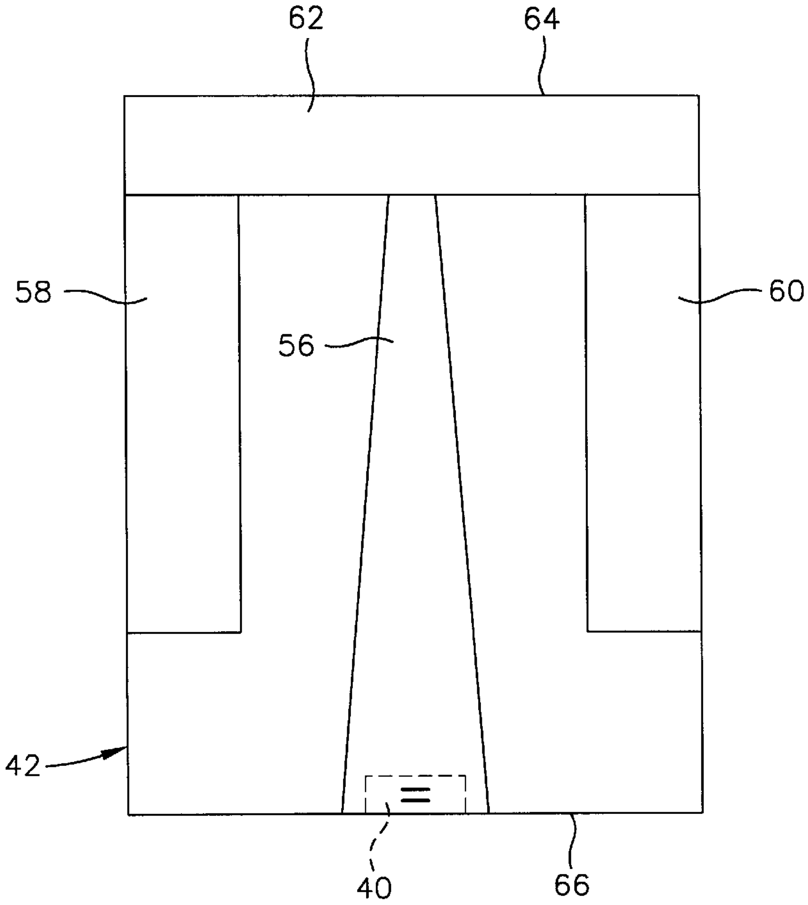
FIG. 5 is an ABS view of the slider taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
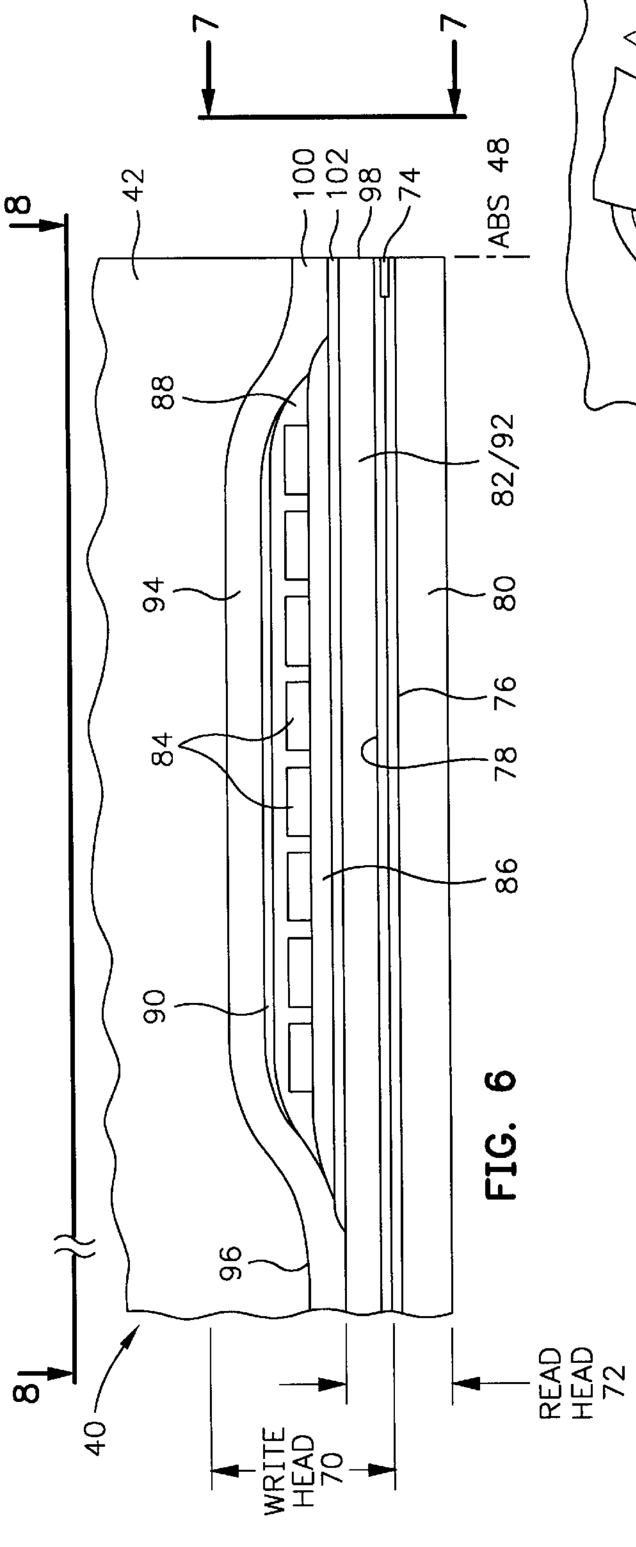
FIG. 6 is a partial view of the slider and magnetic head as seen in plane 6—6 of FIG. 2.
Figure 7:
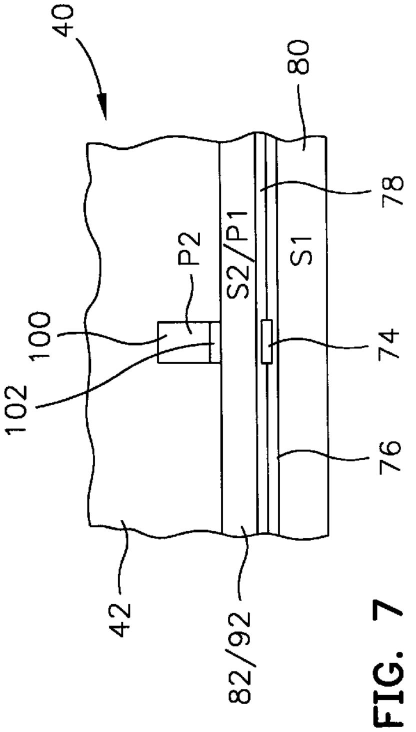
FIG. 7 is a partial ABS view of the slider taken along plane 7—7 of FIG. 6 to show the read and write elements of the magnetic head.

FIG. 6 is a side cross-sectional elevation view of the merged MR head 40, which includes a write head portion 70 and a read head portion 72, the read head portion employing an AP pinned spin valve sensor 74. FIG. 7 is an ABS view of FIG. 6. The spin valve sensor 74 is sandwiched between first and second gap layers 76 and 78, and the gap layers are sandwiched between first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 8:
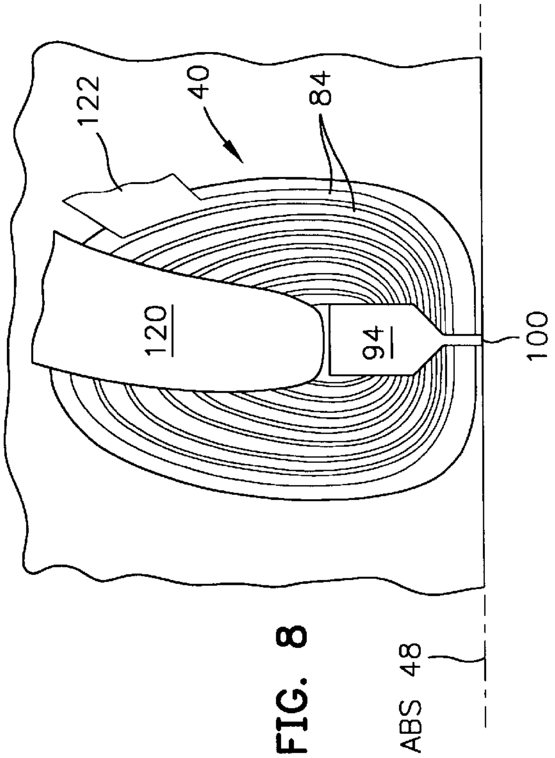
FIG. 8 is a view taken along plane 8—8 of FIG. 6 with all material above the coil layer removed.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
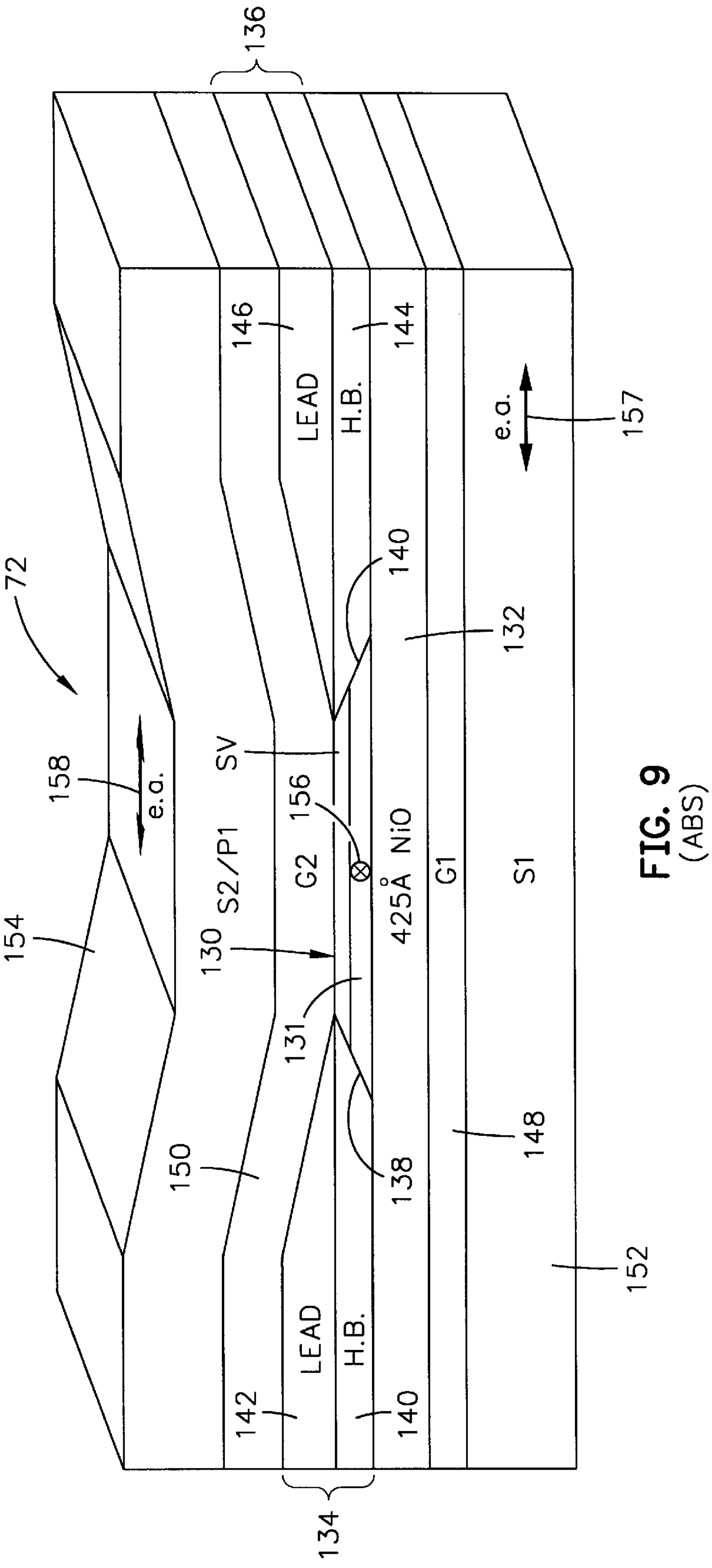
FIG. 9 is an isometric ABS illustration of a read head wherein the second shield (S2) also serves as first pole piece (P1) for the write head 70 shown in FIG. 6.

FIG. 9 is an isometric ABS illustration of the read head 72 shown in FIG. 6. The read head 72 has a spin valve sensor 130 which is located on an antiferromagnetic (AFM) pinning layer 204. The spin valve 130 has an antiferromagnetic (AFM) pinned layer 131 that has a magnetic moment pinned by the magnetic spins of the pinning layer 132 in a direction perpendicular to the ABS, such as into the paper as shown by ⓧ. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers include a first hard bias layer 140 and a first lead layer 142 and the second hard bias and lead layers 136 include a hard bias layer 144 and a lead layer 146. The hard bias layers 140 and 144 produce magnetic fields that extend longitudinally through the spin valve sensor 130 for stabilizing its magnetic domains. The AFM pinning layer 132, the spin valve sensor 130 and the first and second hard bias and lead layers 134 and 136 are located between nonmagnetic electrically insulative first and second gap layers 148 and 150. The first and second gap layers 148 and 150 are, in turn, located between a first shield layer (S1) 152 and a second shield/first pole piece (S2/P1) layer 154.

After completion of the magnetic head 40 shown in FIG. 6 it is important that the magnetic moment 156 of the pinned layer 131 be oriented perpendicular to the ABS, such as into the paper as shown by ⓧ in FIG. 9. It is also important that the easy axes 157 and 158 of the first shield layer 152 and the second shield/first pole piece layer 154, respectively, be oriented parallel to the ABS as shown. This means that the elongated magnetic domains of the layers 154 and 156 will likewise be oriented parallel to the ABS, which is a stable condition of the domains when exposed to applied fields from the write head 70 in FIG. 6 and magnetic fields from the rotating magnetic disk 34 in FIG. 1. Unfortunately, the magnetic domains of the shield layers 152 and 154 may become disoriented when subjected to various temperatures and fields during the construction of the magnetic head. The various processing temperatures and fields and operational fields exerted on the first and second shield layers 152 and 154 will be described hereinafter.

Figure 10A:
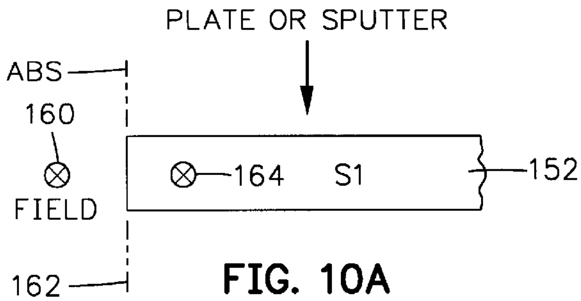
FIGS. 10A–10H are side views of portions of layers that are constructed in a merged MR head.
Figure 10B:
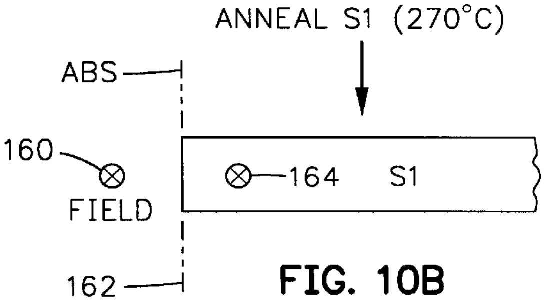
Figure 10C:
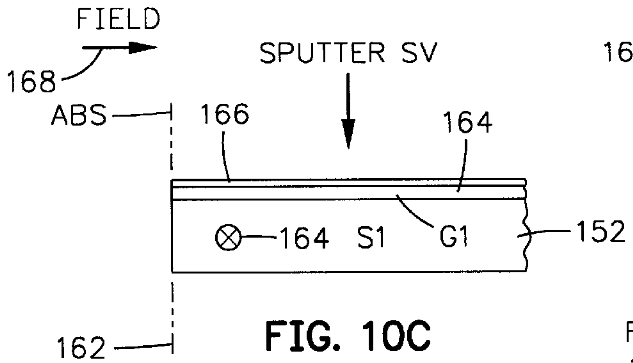
Figure 10D:
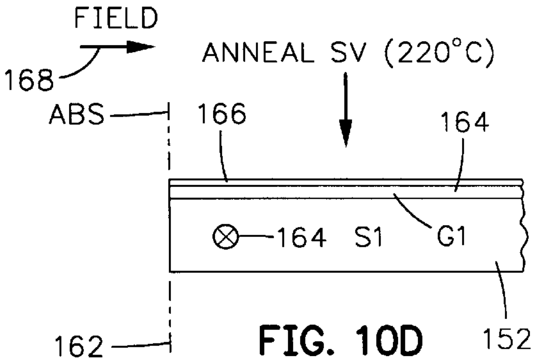
Figure 10E:
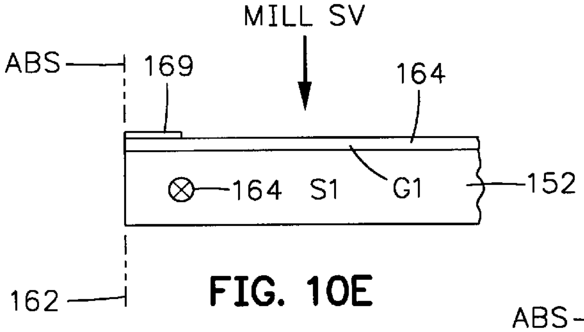
Figure 10F:
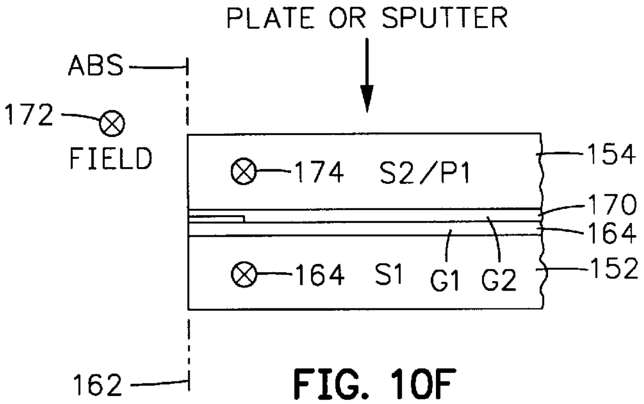
Figure 10G:
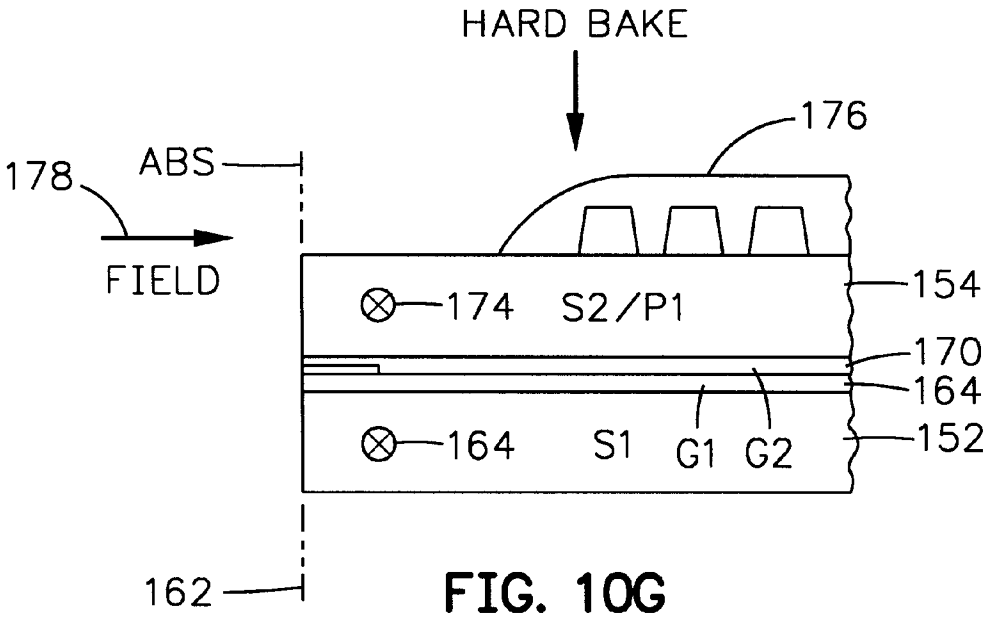
Figure 10H:
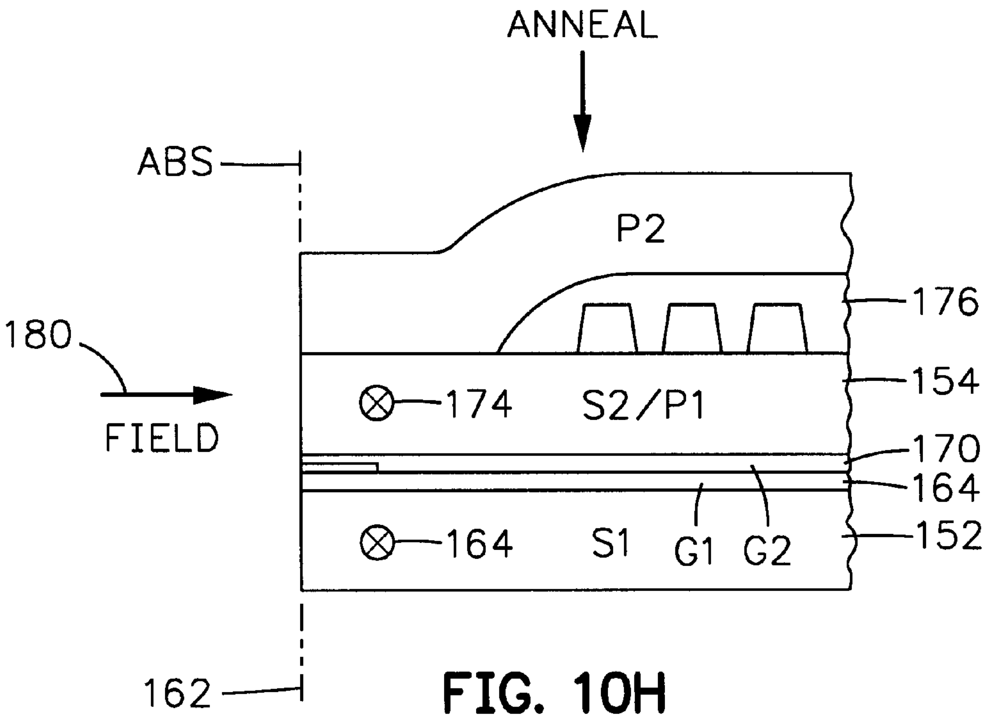

FIGS. 10A–10F illustrate the various processing temperatures and fields exerted on the first and second shield layers 152 and 154. In FIG. 10A the first shield layer 152 is plated in the presence of a field 160 of about 1000 Oe that is directed parallel to the ABS 162 and in the plane of the first shield layer 152. This causes the easy axis 164 of the first shield layer 152 to be directed in the same direction, namely parallel to the ABS and parallel to the plane of the first shield layer 152. As shown in FIG. 1 OB, the first shield is then annealed at a temperature of about 270° C. for 2 hours in the presence of a field of about 1,500 Oe that is directed parallel to the ABS in the plane of the first shield layer. This increases the intrinsic anisotropy field ($H_K$) of the shield layer parallel to the ABS. As shown in FIG. 10C, after sputter depositing a non-magnetic electrically insulative first gap layer (G1) 164, a spin valve (SV) material layer 166 may be formed by sputtering in the presence of a field 168 that is directed perpendicular to the ABS 162. The field 168, which may be directed either to the right or to the left, is for the purpose of orienting the magnetic spins of the antiferromagnetic pinning layer 132 in FIG. 9 in a desired direction that pins the magnetic moment of the pinned layer 131 in FIG. 9 in the same direction. After deposition, the structure is annealed at a high temperature, such as 220° C., in the presence of a magnetic field of 13000 Oe that is oriented perpendicular to the ABS (FIG. 10D). Unfortunately, the steps shown in FIG. 10B may reposition the orientation of the magnetic domains of the first shield layer 152 which will be discussed in more detail hereinafter. In FIG. 10E the spin valve layer 166 is photopatterned and milled to provide a spin valve sensor 169. In FIG. 10F, after sputter depositing a non-magnetic insulative second gap layer 170, the second shield/first pole piece (S2/P1) layer 154 is formed by plating or sputtering in the presence of a field 172 which is directed parallel to the ABS 162 and in the plane of the S2/P1 layer, such as into the paper as shown by ⓧ. This establishes the easy axis 174 of the second shield/first pole piece (S2/P1) layer 154 parallel to the ABS in the plane of the S2/P1 layer. This means that the magnetic domains of the second shield/first pole piece layer 154 will likewise be oriented parallel to the ABS. In FIG. 10G various layers of the insulation stack 176 are hard baked at a high temperature, such as 230° C., in the presence of a field 178 of about 1500 Oe which is directed perpendicular to the ABS 162 for the purpose of maintaining the orientation of the magnetic spins of the pinning layer 132 in FIG. 9 directed perpendicular to the ABS. Unfortunately, this process may reorient the magnetic domains of the first and second shield layers 152 and 154, from their positions 164 and 174, which will be discussed in more detail hereinafter. In FIG. 10H, after completion of the magnetic head, the magnetic spins of the pinning layer 132 in FIG. 9 are reset by annealing at a high temperature of about 220° C. In the presence of a field 180 of about 13,000 Oe which is again directed perpendicular to the ABS 162. Again, this processing step may reorient the magnetic domains of the shield layers from the easy axes 164 and 174, which will be described in more detail hereinafter. It should be noted that if the magnetic domains aligned along the easy axes 164 and 174 are moved from their aligned positions they will be magnetically unstable to applied fields during the operation of the head.

Figure 11:
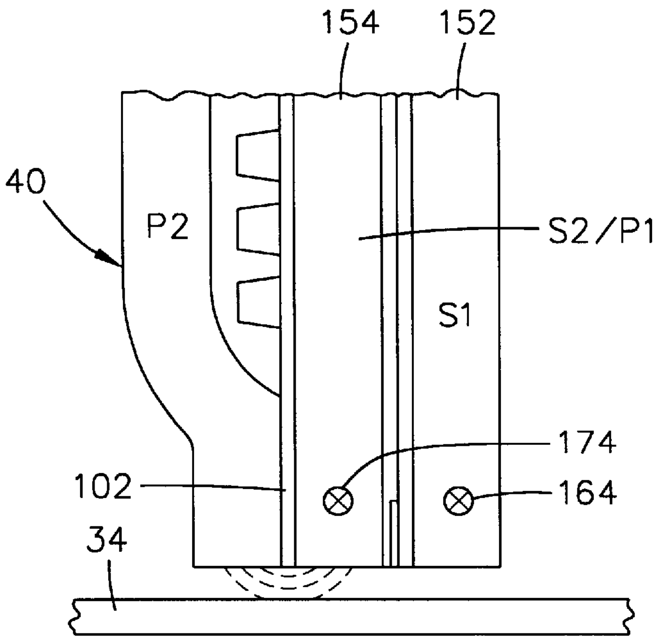
FIG. 11 is an elevation view of a portion of a merged MR head writing signals into a rotating magnetic disk.
Figure 12:
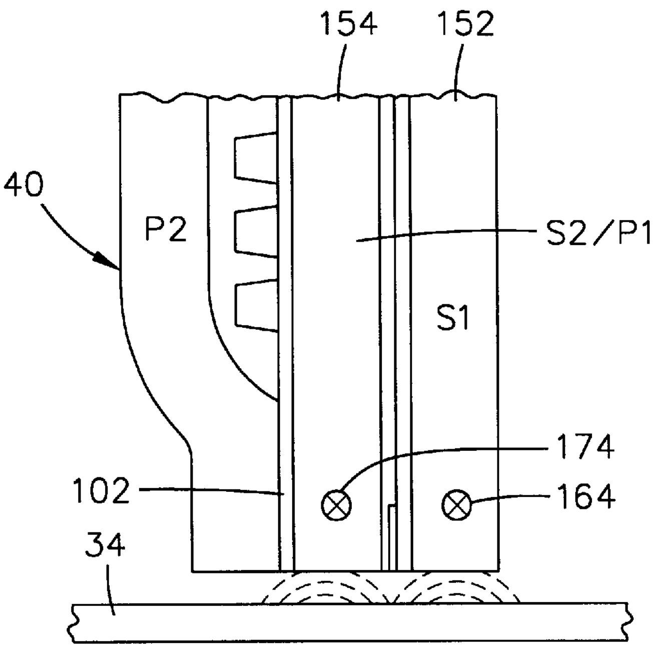
FIG. 12 is the same as FIG. 11 except the disk is injecting magnetic signals into the magnetic head.

FIG. 11 shows magnetic flux fringing across the gap layer 102 of the write head portion of the magnetic head 40. This flux can move the magnetic domains of the first and second shield layers 152 and 154 to various positions if the magnetic domains are not aligned along the easy axes 164 and 174. In the same manner, as shown in FIG. 12, magnetic fields from the rotating magnetic disk 34 may move the magnetic domains of the first and second shield layers 152 and 154 if the magnetic domains are not aligned along the easy axes 164 and 174. If the magnetic domains of either of the layers 152 and 154 move around during operation of the head, this will cause what is known in the art as Barkhausen noise which seriously interferes with the read signal of the read head portion of the magnetic head.

Figure 13A:
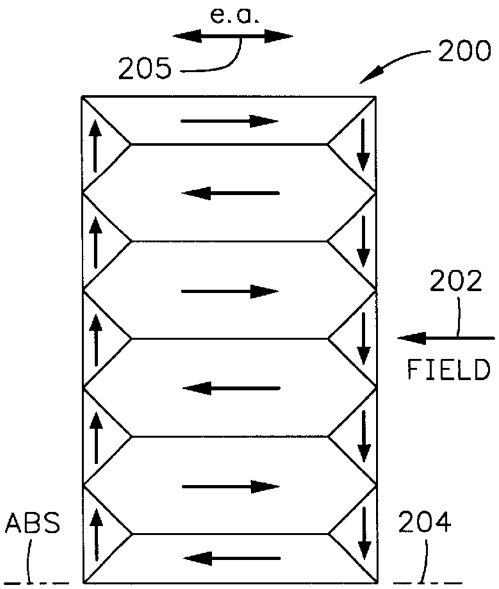
FIGS. 13A–13C are plan views of the second shield/first pole piece (S2/P1) layer of the magnetic head with magnetic domains shown schematically in various conditions.
Figure 13B:
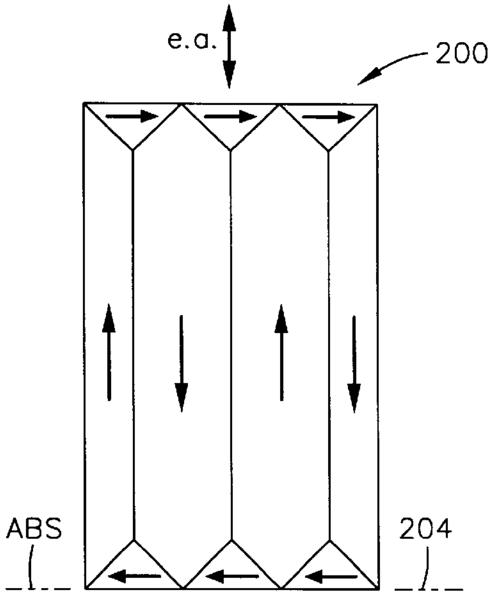
Figure 13C:
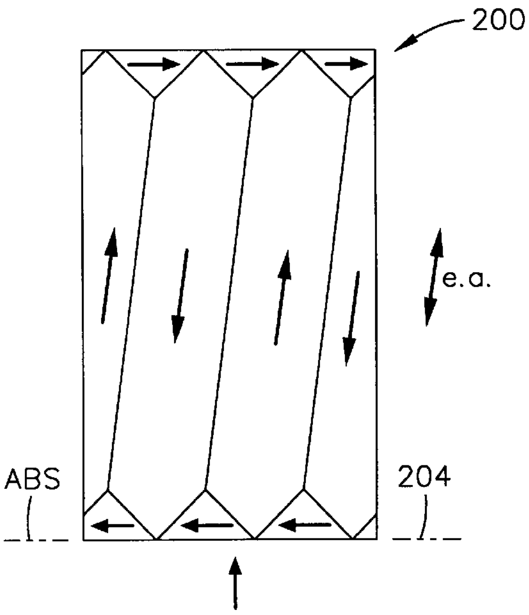

FIGS. 13A–13C show magnetic domain configurations for nickel iron (NiFe) employed as a prior art material for first and second shield layers. In FIG. 13A a nickel iron (NiFe) shield is plated or sputter deposited in the presence of a field 202 which is directed parallel to the ABS 204 in the plane of the layer. This causes the magnetic domains, which are elongated diamonds, to align with their longitudinal axes parallel to the field 202 and with an easy axis 205. The shield layer is then subjected to annealing at a temperature of 250° C. for 2 hours in the presence of a field of 1,500 Oe directed parallel to the ABS in the plane of the shield layer. As stated hereinabove, nickel iron (NiFe) then has an intrinsic magnetic anisotropy of about 2–5 Oe. In FIG. 13B the first or second shield layer 200 is subjected to hard baking of the insulation layers of the write head in the presence of a field perpendicular to the ABS, as shown in FIG. 10G, or subjected to annealing in the presence of a field to orient the magnetic spins of the pinning layer 132 in FIG. 9. The annealing reduces the intrinsic magnetic anisotropy ($H_K$) of the first or second nickel iron (NiFe) shield layer 200 to 0–1 Oe. In conjunction with an unfavorable stress induced anisotropy field, this can cause the magnetic domains to switch their positions from parallel to the ABS, as shown in FIG. 13A, to perpendicular to the ABS, as shown in FIG. 13B. Unfortunately, this is a very unstable position for magnetic domains when they encounter applied fields during the operation of the head. In FIG. 13C a write field, such as 200 Oe, or a disk field, such as 50 Oe, is applied to the first or second shield layer 200 which causes the magnetic domains to move from their position perpendicular to the ABS. This movement causes Barkhausen noise which is a problem obviated by the present invention. Accordingly, it is important that the intrinsic anisotropy ($H_K$) of the shield be higher so that even after annealing in a field perpendicular to the ABS, the shield retains sufficient anisotropy field ($H_K$). Alternatively, the shield material may become isotropic, thereby losing its intrinsic anisotropy ($H_K$).

FIGS. 14A–14E illustrate plan views of a first or second shield layer 300 of the present invention wherein the magnetic domains are not destabilized by subsequent processing steps nor are they moved by applied fields during operation of the head. This is accomplished by employing a nickel cobalt material which is preferably $Ni_{70}Co_{30}$ (wt. %) or a nickel iron cobalt alloy. The $Ni_{70}Co_{30}$ (wt. %) material has a near zero magnetostriction and an intrinsic anisotropy of 25–30 Oe. A preferred material, even over nickel cobalt, is a nickel iron cobalt alloy which is a $Ni_{0.81(100-x)+y}Fe_{0.19(100-x)-y}CO_x$ (wt. %) layer where $0.5 \leqq x \leqq 25$ and $-5 \leqq y \leqq 5$, which also has near zero magnetostriction and has a lower intrinsic anisotropy field ($H_K$) of 5–20 Oe. The lower $H_K$ is desirable from the standpoint that the magnetic material is softer so as to function better as a shield layer and yet have sufficient $H_K$ to better withstand the aforementioned decrease in $H_K$ that occurs during annealing. The nickel cobalt and nickel iron cobalt alloy will be referred to hereinafter as a nickel (iron) cobalt material.

Figure 14A:
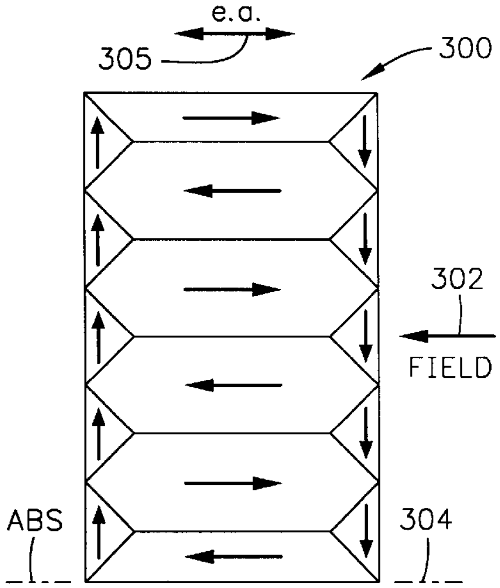
FIGS. 14A–14D are plan views of a second shield/first pole piece (S2/P1) layer of a merged magnetic head with magnetic domains shown schematically under various applied field conditions.
Figure 14B:
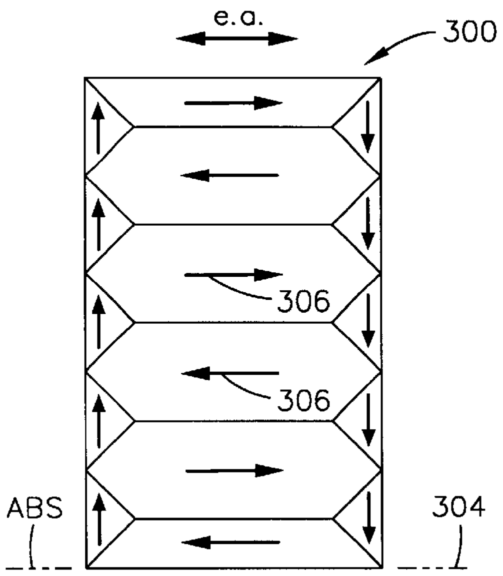
Figure 14C:
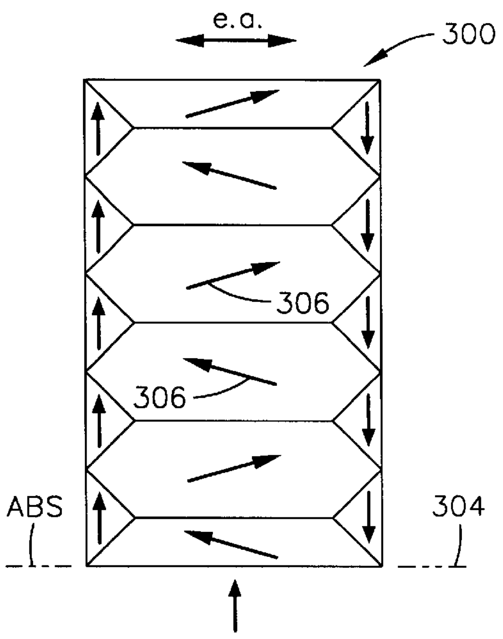
Figure 14D:
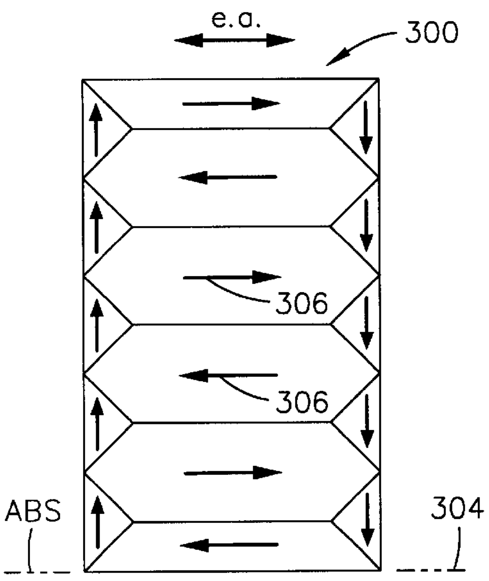

In FIG. 14A the first and/or second shield layer 300 is constructed of the nickel (iron) cobalt material. It may be plated or sputter deposited in the presence of a field 302 which is parallel to the ABS 304 and the plane of the shield layer. This establishes the easy axis 305 parallel to the ABS and the longitudinal axes of the magnetic domains parallel to the ABS as shown. It is also annealed with the same field as described in reference to FIG. 13A. It is desirable that this orientation of the magnetic domains be retained during subsequent construction and operation of the head. In FIG. 14B the layer 300 has been subjected to hard baling and a field, as shown in FIG. 10G, or to annealing in the presence of a field for resetting, as shown in FIG. 10H. Since the intrinsic anisotropy ($H_K$) is higher, the shield can tolerate a greater loss of anisotropy during annealing and still retain sufficient intrinsic anisotropy to maintain the domains parallel to the ABS, even in the presence of possibly unfavorable stress induced anisotropy. In FIG. 14C the layer 300 is subjected to applied fields from the write head or from the disk as shown in FIGS. 11 and 12 which will cause the magnetic moments 306 to rotate as shown. However, the magnetic domains retain their parallel orientation. Upon the removal of the operational applied fields the magnetic moments 306 return to their parallel orientations, as shown in FIG. 14D. Accordingly, after construction of the first shield and/or second shield/first pole piece layer 300, as shown in FIG. 14A, the magnetic domains are not reoriented during the processing steps in FIG. 14B and do not move during operation of the head as shown in FIG. 14D. This results in the elimination of the aforementioned Barkhausen noise which degrades the performance of the read head.

It should be understood that the aforementioned problems in the prior art are particularly apparent when nickel manganese (NiMn) or the like is employed for an antiferromagnetic pinning layer in a top spin valve sensor. During the hard baking step the spins of the nickel manganese (NiMn) pinning layer must be maintained with a field perpendicular to the ABS since the high blocking temperature (350° C.) of nickel manganese (NiMn) does not permit resetting after completion of the heads. With a nickel oxide (NiO) pinning layer for a bottom spin valve sensor a field parallel to the ABS may be employed during the hard baking step since nickel oxide (NiO) has a low blocking temperature (200° C.) and can easily be reset after construction of the head.

Figure 15:
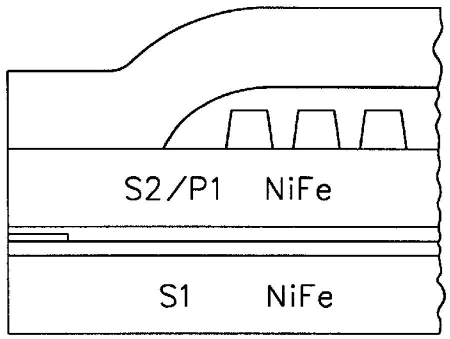
FIG. 15 is an elevation view of a front portion of a magnetic head employing a prior art material for the S1 and S2/P1 layers.
Figure 16A:
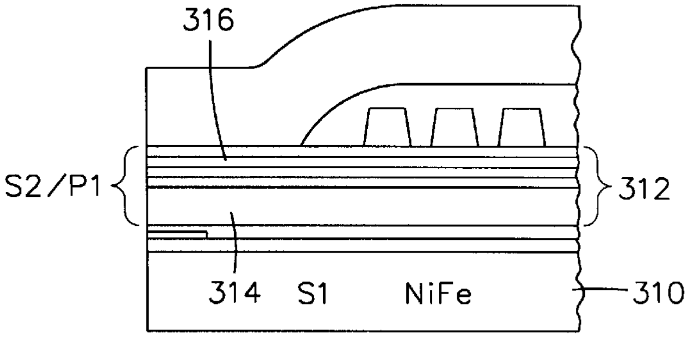
FIGS. 16A–16F are elevation view of a front portion of a merged magnetic head with various combinations of materials and laminates according to the present invention.
Figure 16B:
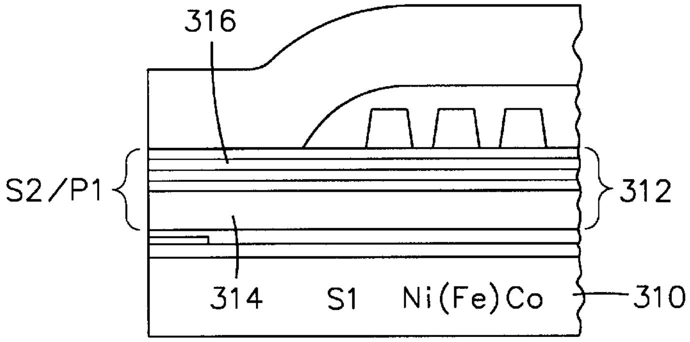
Figure 16C:
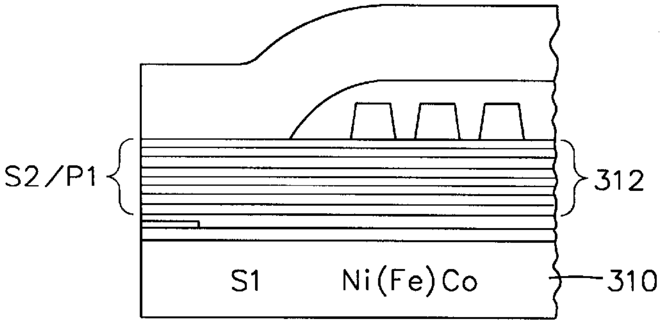
Figure 16D:
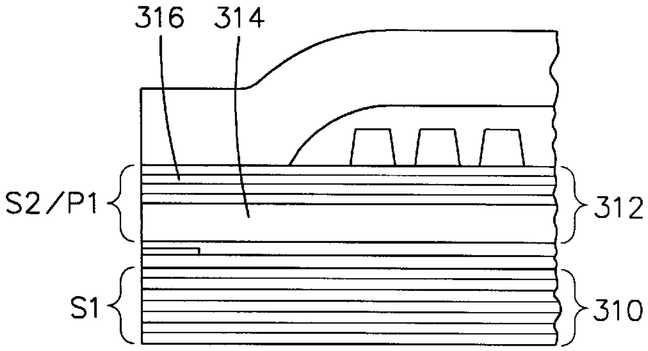
Figure 16E:
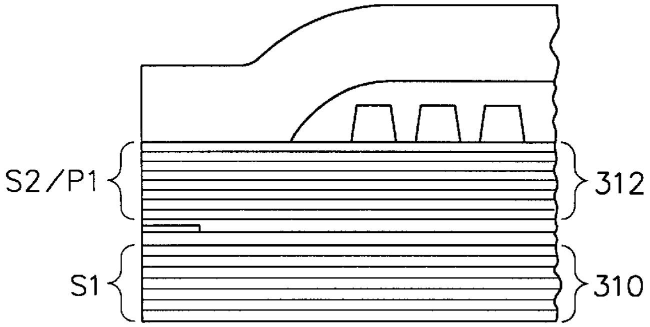
Figure 16F:
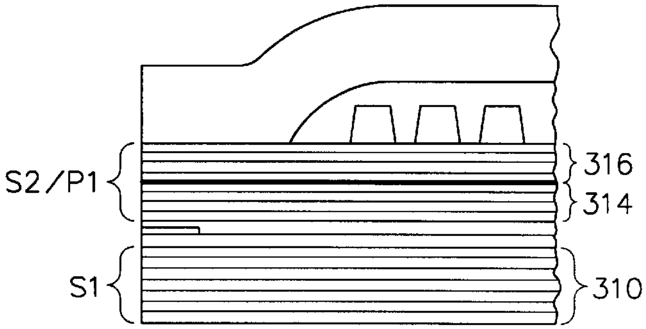

FIG. 15 is an elevation side view of a front portion of a merged MR head wherein the first and second shield layers S1 and S2/P1 are constructed of nickel iron (NiFe). While nickel iron has soft magnetic properties and near zero magnetostriction it suffers from the problem of reorientation of its magnetic domains from a parallel position to the ABS to an unstable perpendicular position with respect thereto as explained in FIGS. 13A and 13B. FIGS. 16A–16F illustrate various embodiments of the present invention wherein different combinations of materials may be employed for the first shield layer 310 and different materials and laminates may be employed for the second shield/first pole piece (S2/P1) layer 312. In FIG. 16A, the first shield layer 310 is constructed of nickel iron (NiFe) and the second shield/first pole piece layer (S2/P1) 312 is constructed of first and second layers 314 and 316. The layer 314 may be a nickel cobalt or nickel iron cobalt material which may be plated and the second layer 316 is a laminate of a high moment magnetic material, such as iron nitride (FeN), laminated with aluminum oxide ($Al_2O_3$). FIG. 16B is the same as FIG. 16A except the first shield layer is a nickel (iron) cobalt material wherein nickel (iron) cobalt is nickel cobalt or nickel iron cobalt. FIG. 16C is the same as FIG. 16B except the second shield/first pole piece layer (S2/P1) 312 is constructed entirely of a laminate of a nickel (iron) cobalt material laminated with aluminum oxide ($Al_2O_3$) material layers. FIG. 16D is the same as FIG. 16B except the first shield layer 310 is constructed of a laminate of a nickel (iron) cobalt material laminated with aluminum oxide ($Al_2O_3$) layers. FIG. 16E is the same as FIG. 16D except both the first and second shield layers 310 and 312 are constructed entirely of a laminate of nickel (iron) cobalt material and aluminum oxide ($Al_2O_3$) layers. FIG. 16F is the same as FIG. 16E except the second shield/first pole piece layer (S2/P1) is a laminate 314 of nickel (iron) cobalt and aluminum oxide ($Al_2O_3$) layers and a laminate 316 of iron nitride (FeN) and aluminum oxide ($Al_2O_3$) layers. The specifics of these layers are discussed next.

FIGS. 17A and 17B show specific embodiments which may be employed for the first shield layer 310. In FIG. 17A a nickel (iron) cobalt material is plated or sputtered to form the first shield layer 310. The total thickness of this layer may be 2 $\mu$m±1 $\mu$m. In FIG. 17B a laminate of a nickel (iron) cobalt material and aluminum oxide ($Al_2O_3$) is sputter deposited with an exemplary thickness of 2 $\mu$m. This may be accomplished by employing 1,000 Å thick nickel (iron) cobalt material and 50 Å thick aluminum oxide ($Al_2O_3$) 20 times which is a 2 $\mu$m magnetic thickness of the layer. The actual physical thickness will be somewhat greater because of the thickness of the aluminum oxide ($Al_2O_3$) layers.

Figure 18C:
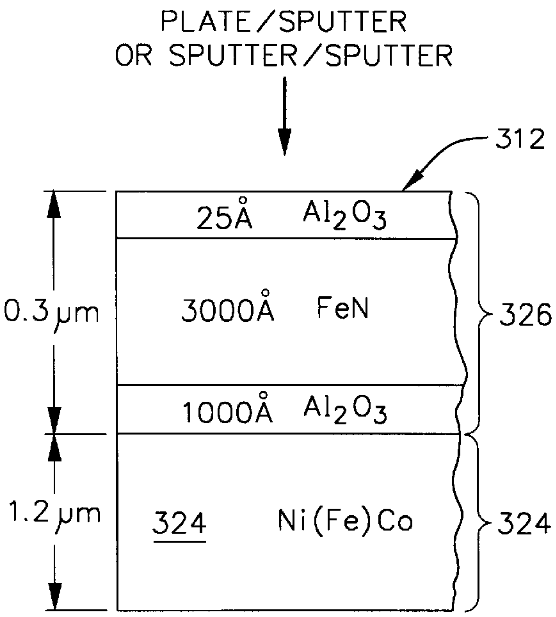

FIGS. 18A—18F show various embodiments of materials and layers for the second shield/first pole piece layer 312. One embodiment is shown in FIG. 18A wherein a nickel (iron) cobalt material is plated or sputtered to a thickness of 1.2 $\mu$m. This layer will have near zero magnetostriction and soft magnetic properties, which is desirable for a shield layer for the read head. However, the moment is somewhat small and, in a preferred embodiment, the magnetic moment is increased by a laminate of a high moment material as shown in FIG. 18B. The second shield/first pole piece layer 312 in FIG. 18B includes first and second layers 320 and 322. The first layer 320 may be a nickel (iron) cobalt material that is plated or sputtered to a thickness such as 1.2 $\mu$m. The second layer 322 is a sputtered laminate of a high magnetic moment material, such as iron nitride (FeN), laminated with layers of aluminum oxide ($Al_2O_3$). The iron nitride layers may be 500 Å thick and the aluminum oxide ($Al_2O_3$) layers may be 25 Å thick. If this laminate is repeated 6 times the magnetic thickness of the second layer 322 is 0.3 $\mu$m giving a total magnetic thickness of 1.5 $\mu$m for the second shield first pole piece layer 312.

In FIG. 18C the second shield/first pole piece layer 312 has first and second layers 324 and 326. The first layer 324 is a nickel (iron) cobalt layer material which may be plated or sputtered and the second layer 326 is a sputtered laminate of a high magnetic moment material, such as iron nitride (FeN) laminated with aluminum oxide ($Al_2O_3$). The first layer may be 1.2 $\mu$m thick. A single iron nitride layer 3,000 Å thick may be sandwiched between 1,000 Å thick aluminum oxide ($Al_2O_3$) and 25 Å thick aluminum oxide ($Al_2O_3$). The total magnetic thickness of this layer is 1.5 $\mu$m.

Figure 18D:
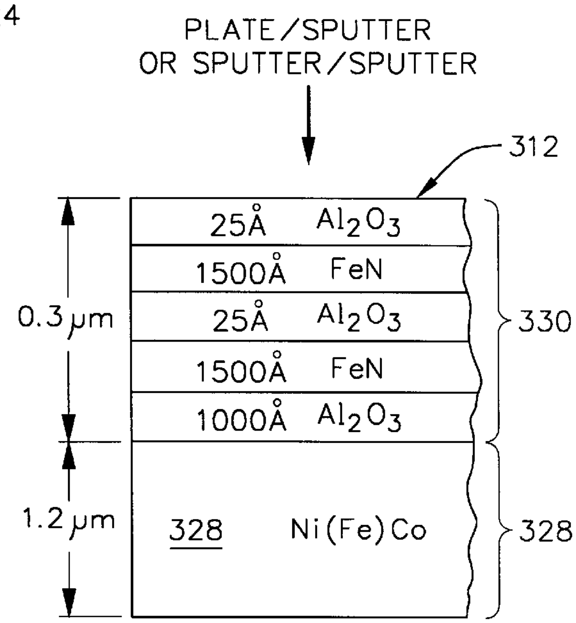

The second shield/first pole piece layer 312 in FIG. 18D may have first and second layers 328 and 330 wherein the first layer is a 1.2 $\mu$m thick plated or sputtered nickel (iron) cobalt material layer. The second layer 330 may be a sputtered laminate of iron nitride (FeN) wherein a first layer 1,000 Å thick of aluminum oxide ($Al_2O_3$) may be sputter deposited followed by 1500 Å of iron nitride (FeN) followed by 25 Å of aluminum oxide ($Al_2O_3$) followed by 1500 Å of iron nitride (FeN) followed by 25 Å of aluminum oxide ($Al_2O_3$). The total magnetic thickness of the second layer 330 is 0.3 $\mu$m giving a total magnetic thickness of the S2/P1 layer of 1.5 $\mu$m.

Figure 18E:
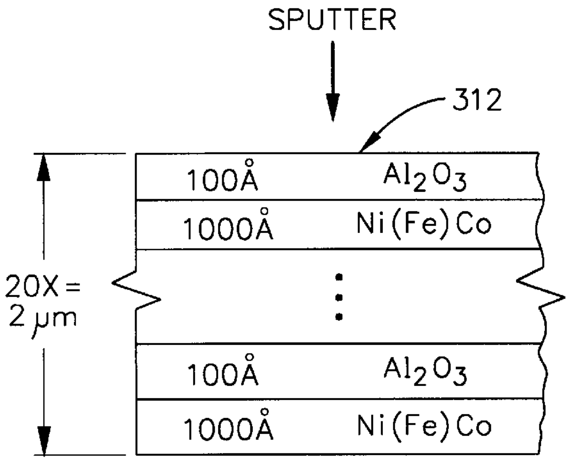

In FIG. 18E the second shield/first pole piece layer 312 is constructed entirely of a sputtered laminate of nickel (iron) cobalt material laminated with aluminum oxide ($Al_2O_3$) layers. The nickel (iron) cobalt layers may be 1,000 Å thick and the aluminum oxide ($Al_2O_3$) layers may be 100 Å thick. The total magnetic thickness of the S2/P1 layer 312 if the nickel iron cobalt layers are replicated 20 times is 2 $\mu$m.

Figure 18F:
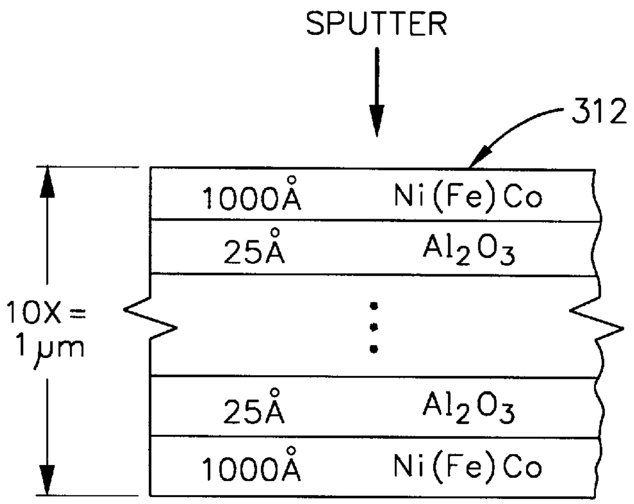

FIG. 18F is similar to FIG. 18E except the aluminum oxide layers are 25 Å thick. If the nickel (iron) cobalt layers are replicated 10 times the total magnetic thickness of the second shield/first pole piece layer 312 is 1 $\mu$m.

Figure 18G:
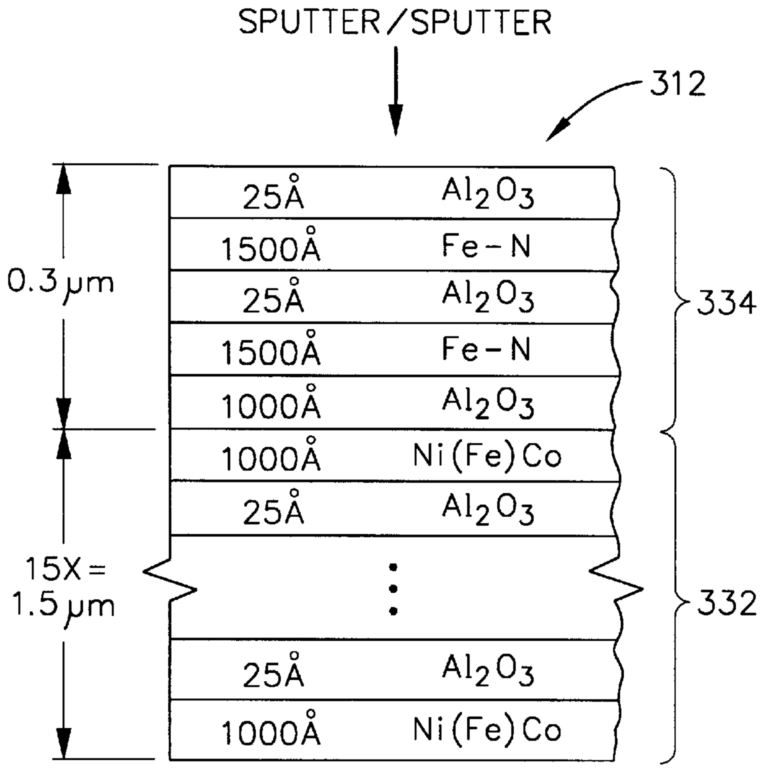

In FIG. 18G the second shield/first pole piece layer 312 includes a laminate of nickel (iron) cobalt 332 and a laminate of iron nitride (FeN) 334. The laminate 332 may include nickel (iron) cobalt layers 1000 Å thick and aluminum oxide ($Al_2O_3$) layers 25 Å thick replicated 15 times to give a magnetic thickness of 1.5 $\mu$m. The laminate 334 may include iron nitride (FeN) 1500 Å thick laminated with aluminum oxide ($Al_2O_3$) 25 Å thick replicated 3 times to provide a magnetic thickness of 0.3 $\mu$m.

The preferred embodiments for the second shield/first pole piece layer 312 are shown in FIGS. 18B, 18C, 18D and 18G. The reason for this is because the iron nitride laminate provides a higher magnetic moment so that the second shield/first pole piece layer can better serve as a first pole piece flux conducting layer for the write head 70 shown in FIG. 6. Wherever iron nitride (FeN) is referred to it should be understood that it may include an additional element such as B, Al, Si, Ti, Zr, Hf, V, Nb, Ta, Cr, Mo, Ru, Ga, Ge or Sm so that all claims existing in the application would be set forth in one document.

Clearly, other embodiments and modifications of this invention will occur readily to those of ordinary skill in the art in view of these teachings. For instance, the spin valve sensor may be employed for purposes other than a magnetic disk drive, such as a tape drive, search and surveillance devices and laboratory equipment. Therefore, this invention is to be limited only by following claims, which include all such embodiments and modifications when viewed in conjunction with the above specification and accompanying drawings.

We claim:

1. A magnetic head assembly, that has an air bearing surface, comprising:

a read head including:

a read sensor with first and second leads connected thereto;

first and second nonmagnetic electrically insulative first and second gap layers;

the read sensor being sandwiched between the first and second gap layers;

ferromagnetic first and second shield layers; and at least one of the shield layers comprising nickel cobalt or a nickel iron cobalt based alloy;

a write head wherein the second shield layer also serves as a first pole piece for the write head, the write head including:

an insulation stack with at least one coil layer embedded therein;

a nonmagnetic electrically insulative write gap layer;

a second pole piece layer having a yoke region between pole tip and back gap regions;

the insulation stack being sandwiched between the second shield layer and the second pole piece layer in the yoke region, the write gap layer being sandwiched between the first pole piece layer and the second pole piece layer in the pole tip region and the first pole piece layer and the second pole tip layer being connected together at the back gap region;

the second shield layer including first and second layers wherein the first layer is sandwiched between the second gap layer and said second layer;

the first layer comprising nickel cobalt or a nickel iron cobalt based alloy; and the second layer being a laminate of alternate nonmagnetic material and high moment magnetic material layers.

2. A magnetic head assembly as claimed in claim 1 wherein the nonmagnetic material layer is aluminum oxide ($Al_2O_3$).

3. A magnetic head assembly as claimed in claim 2 wherein the high moment magnetic material layer is iron nitride (FeN).

4. A magnetic head assembly as claimed in claim 3 wherein the first shield layer consists entirely of a lamination of alternate nonmagnetic material and nickel cobalt or nickel iron cobalt based alloy material layers.

5. A magnetic head assembly, that has an air bearing surface (ABS), comprising:

a read head including:

a read sensor with first and second leads connected thereto;

first and second nonmagnetic electrically insulative first and second gap layers;

the read sensor being sandwiched between the first and second gap layers;

ferromagnetic first and second shield layers; and at least one of the shield layers comprising nickel cobalt or a nickel iron cobalt based alloy;

a write head wherein the second shield layer also serves as a first pole piece for the write head, the write head including:

an insulation stack with at least one coil layer embedded therein;

a nonmagnetic electrically insulative write gap layer;

a second pole piece layer having a yoke region between pole tip and back gap regions;

the insulation stack being sandwiched between the second shield layer and the second pole piece layer in the yoke region, the write gap layer being sandwiched between the first pole piece layer and the second pole piece layer in the pole tip region and the first pole piece layer and the second pole tip layer being connected together at the back gap region;

the second shield layer comprising first and second laminates;

the first laminate being alternate nonmagnetic material and low magnetic moment material layers;

the second laminate being alternate nonmagnetic material and high magnetic moment material layers;

the high magnetic moment material having a magnetic moment that is higher than the low magnetic material; and the second laminate being located between the first laminate and the write gap layer.

6. A magnetic head assembly as claimed in claim 5 wherein the low magnetic material is nickel (iron) cobalt and the high magnetic moment material is iron nitrate (FeN).

7. A magnetic head assembly, that has an air bearing surface (ABS, comprising:

a read head including:

a read sensor with first and second leads connected thereto;

first and second nonmagnetic electrically insulative first and second gap layers;

the read sensor being sandwiched between the first and second gap layers;

ferromagnetic first and second shield layers;

the second shield layer including first and second layers wherein the first layer is sandwiched between the second gap layer and said second layer;

the first layer comprising nickel cobalt ($Ni_{70}Co_{30}$ wt. %); and the second layer being a laminate of alternate nonmagnetic material and high moment magnetic material layers;

a write head wherein the second shield layer also serves as a first pole piece for the write head, the write head including:

an insulation stack with at least one coil layer embedded therein;

a nonmagnetic electrically insulative write gap layer;

a second pole piece layer having a yoke region between pole tip and back gap regions; and the insulation stack being sandwiched between the second shield layer and the second pole piece layer in the yoke region, the write gap layer being sandwiched between the first pole piece layer and the second pole piece layer in the pole tip region and the first pole piece layer and the second pole tip layer being connected together at the back gap region.

8. A magnetic head assembly as claimed in claim 7 wherein the nonmagnetic material layer is aluminum oxide ($Al_2O_3$).

9. A magnetic head assembly as claimed in claim 8 wherein the high moment magnetic material layer is iron nitride (FeN).

10. A magnetic head assembly as claimed in claim 9 wherein the first shield layer consists entirely of a lamination of alternate nonmagnetic material and nickel cobalt layers.

11. A magnetic head assembly, that has an air bearing surface (ABS), comprising:

a read head including:

a read sensor with first and second leads connected thereto;

first and second nonmagnetic electrically insulative first and second gap layers;

the read sensor being sandwiched between the first and second gap layers;

ferromagnetic first and second shield layers;

the second shield layer including first and second layers wherein the first layer is sandwiched between the second gap layer and said second layer;

the first layer comprising a nickel iron cobalt based alloy wherein the nickel iron cobalt based alloy is a $Ni_{0.81(100-x)+y}Fe_{0.19(100-x)-y}Co_x$ (wt. %) layer where $0.5 \leqq x \leqq 25$ and $-5 \leqq y \leqq 5$; and the second layer being a laminate of alternate nonmagnetic material and high moment magnetic material layers;

a write head wherein the second shield layer also serves as a first pole piece for the write head, the write head including:

an insulation stack with at least one coil layer embedded therein;

a nonmagnetic electrically insulative write gap layer;

a second pole piece layer having a yoke region between pole tip and back gap regions; and the insulation stack being sandwiched between the second shield layer and the second pole piece layer in the yoke region, the write gap layer being sandwiched between the first pole piece layer and the second pole piece layer in the pole tip region and the first pole piece layer and the second pole tip layer being connected together at the back gap region.

12. A magnetic head assembly as claimed in claim 11 wherein the nonmagnetic material layer is aluminum oxide ($Al_2O_3$).

13. A magnetic head assembly as claimed in claim 12 wherein the high moment magnetic material layer is iron nitride (FeN) based.

14. A magnetic head assembly as claimed in claim 13 wherein the first shield layer consists entirely of a lamination of alternate nonmagnetic material and nickel iron cobalt based alloy layers.

15. A magnetic disk drive that includes at least one magnetic head assembly having an air bearing surface (ABS), a read head and a write head, the disk drive comprising:

the read head including:

a read sensor with first and second leads connected thereto;

first and second nonmagnetic electrically insulative first and second gap layers;

the read sensor being sandwiched between the first and second gap layers;

ferromagnetic first and second shield layers; and at least one of the shield layers comprising nickel cobalt or a nickel iron cobalt based alloy; and the write head including:

first and second pole piece layers wherein the first pole piece layer is a common layer with said second shield layer;

a write gap layer;

the first and second pole piece layers being separated by the write gap layer at the ABS and connected together at a back gap;

an insulation stack with at least one coil layer embedded therein; and the insulation stack being sandwiched between the first and second pole piece layers and being located between the ABS and said back gap;

a frame;

a magnetic disk rotatably supported on the frame;

a support mounted on the frame for supporting the magnetic head assembly in a transducing relationship with the magnetic disk;

means for rotating the magnetic disk;

positioning means connected to the support for moving the magnetic head assembly to multiple positions with respect to said magnetic disk; and means connected to the magnetic head assembly, to the means for rotating the magnetic disk and to the positioning means for exchanging signals with the magnetic head assembly, for controlling movement of the magnetic disk and for controlling the position of the magnetic head assembly.

16. A magnetic disk drive as claimed in claim 15 wherein only the first shield layer comprises nickel cobalt or a nickel iron cobalt based alloy.

17. A magnetic disk drive as claimed in claim 15 wherein each of the first and second shield layers comprises nickel cobalt or a nickel iron cobalt based alloy.

18. A magnetic disk drive as claimed in claim 15 including:

the second layer comprising first and second laminates;

the first laminate being alternate nonmagnetic material and low magnetic moment material layers;

the second laminate being alternate nonmagnetic material and high magnetic moment material layers;

the high magnetic moment material having a magnetic moment that is higher than the low magnetic material; and the second laminate being located between the first laminate and the write gap layer.

19. A magnetic disk drive as claimed in claim 18 wherein the low magnetic material is nickel (iron) cobalt and the high magnetic moment material is iron nitride (FeN).

20. A magnetic head disk drive that includes at least one magnetic head assembly having an air bearing surface (ABS), a read head and a write head, the disk drive comprising:

the read head including:

a read sensor with first and second leads connected thereto;

first and second nonmagnetic electrically insulative first and second gap layers;

the read sensor being sandwiched between the first and second gap layers;

ferromagnetic first and second shield layers;

the second shield layer including first and second layers wherein the first layer is sandwiched between the second gap layer and said second layer;

the first layer comprising nickel cobalt or a nickel iron cobalt based alloy; and the second layer being a laminate of alternate nonmagnetic material and high moment magnetic material layers;

the write head including:

first and second pole piece layers wherein the first pole piece layer is a common layer with said second shield layer;

a write gap layer;

the first and second pole piece layers being separated by the write gap layer at the ABS and connected together at a back gap;

an insulation stack with at least one coil layer embedded therein; and the insulation stack being sandwiched between the first and second pole piece layers and being located between the ABS and said back gap;

a frame;

a magnetic disk rotatably supported on the frame;

a support mounted on the frame for supporting the magnetic head assembly in a transducing relationship with the magnetic disk;

means for rotating the magnetic disk;

positioning means connected to the support for moving the magnetic head assembly to multiple positions with respect to said magnetic disk; and means connected to the magnetic head assembly, to the means for rotating the magnetic disk and to the positioning means for exchanging signals with the magnetic head assembly, for controlling movement of the magnetic disk and for controlling the position of the magnetic head assembly.

21. A magnetic disk drive as claimed in claim 20 wherein the nonmagnetic material layer is aluminum oxide ($Al_2O_3$).

22. A magnetic disk drive as claimed in claim 21 wherein the high moment magnetic material layer is iron nitride (FeN).

23. A magnetic disk drive as claimed in claim 22 wherein the first shield layer consists entirely of a lamination of alternate nonmagnetic material and nickel cobalt or nickel iron cobalt based alloy material layers.

* * * * *